Patented Apr. 9, 1929.

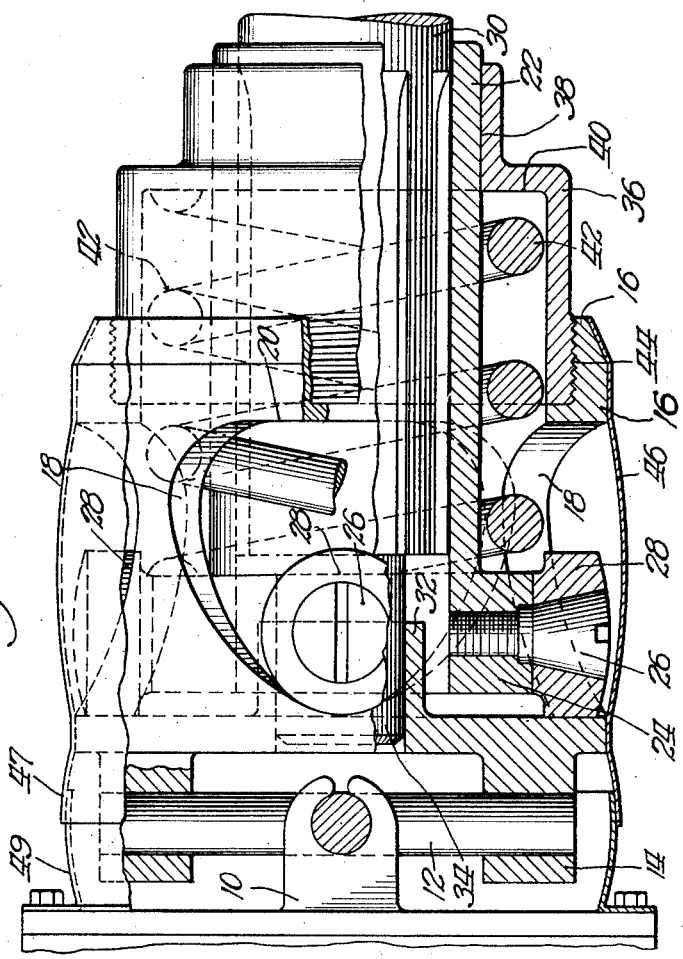
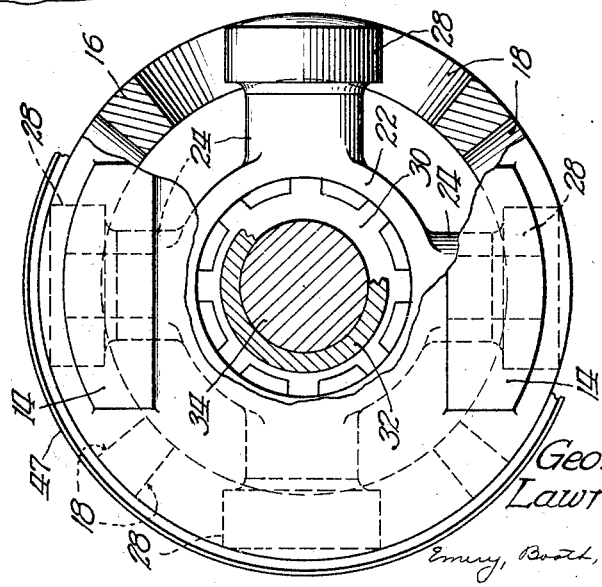

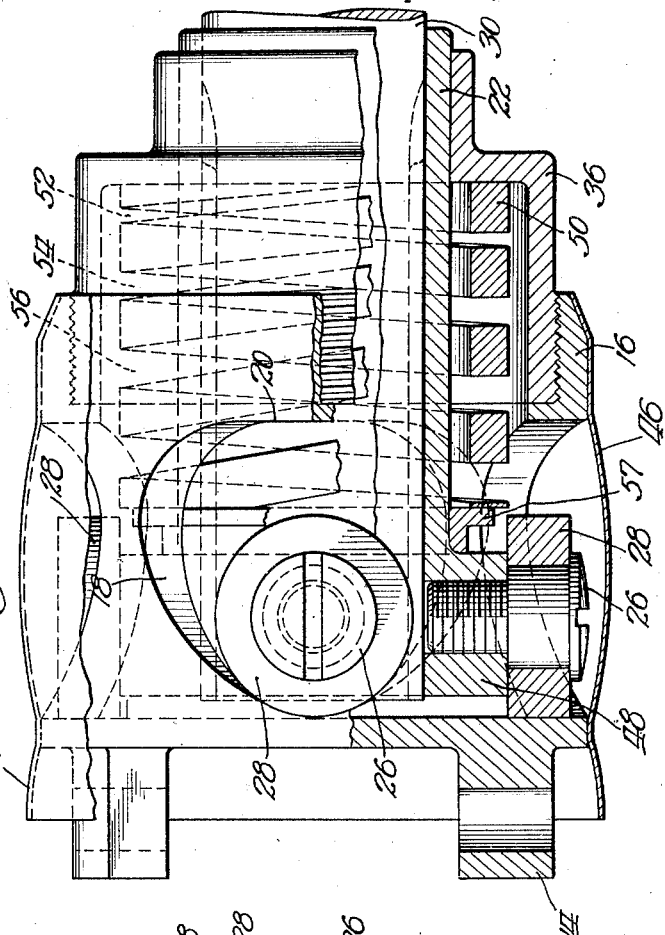
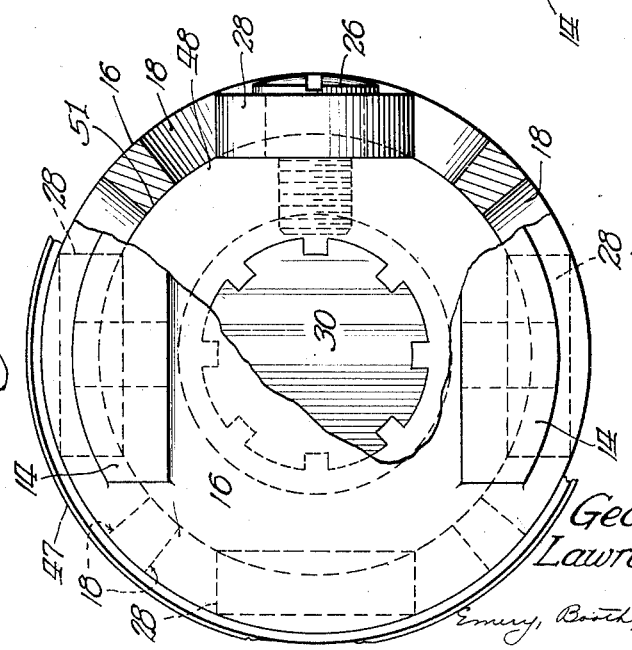

1,708,924

UNITED STATES PATENT OFFICE.

GEORGE W. COLE AND LAWRENCE V. DAVIS, OF MISHAWAKA, INDIANA, ASSIGNORS TO VITUS G. JONES, TRUSTEE.

POWER TRANSMISSION.

Application filed April 28, 1927. Serial No. 187,160.

Our invention relates to power transmission, and more specifically to an improved device for absorbing energy to prevent shock. The device illustrated has its principal field of use in connection with the internal combustion power plants of motor vehicles.

Among the objects and advantages of the invention may be enumerated the elimination of all tendencies to oscillate or vibrate, preferably without the absorption or dissipation of any energy by the transmission, and smoothness of operation in spite of abrupt changes in loads and speeds.

In the accompanying drawings,

Figure 1 is a side elevation, partly in longitudinal section, of a device according to the invention;

Figure 2 is an end elevation of the same device, partly in transverse section;

Figure 3 is a side elevation, partly in longitudinal section, of another form of device; and Figure 4 is an end view, partly in transverse section, of the device of Figure 3.

In the embodiment of the invention selected for illustration in Figs. 1 and 2, power is received from the source, which may be an internal combustion engine, through the drive element 10 and the cross 12 of a universal joint connection. The driven sockets 14 are formed integral with a main casing 16. In the walls of this casing we fashion cam shaped openings having oppositely facing symmetrical inclined faces at 18, the entire opening being roughly heart-shaped, except that the top at 20 is flat rather than curved back. We have illustrated four such cam shaped openings.

A sleeve 22 is provided with radial bosses 24 in number corresponding to the openings, each boss being threaded to receive a pin 26 forming a pintle for an anti-friction roller 28.

The sleeve 22 is splined directly to the driven shaft 30, which shaft is the final transmission element of that portion of the transmission illustrated. Alignment between the shaft 30 and the casing 16 is maintained by a central axial boss 32 in the bottom of the casing, receiving a projection 34 on the end of the shaft.

We have provided resilient means tending to hold the rollers 28 at the bottoms of the cam shaped openings. The compression nut 36 has a cylindrical fit at 38 on the sleeve 22. A shoulder at 40 forms an abutment for the compression spring 42 which, at its other end, abuts the bosses 24 on the sleeve. A threaded connection at 44 between the compression nut 36 and the casing 16 facilitates assembly of the device and adjustment of the tension of the spring.

We prefer to provide a sheet metal dust shield 46 to retain lubricant and protect the parts from dirt. This may have articulation at 47 with a shield 49 on drive element 10.

The construction illustrated in Fig. 3 is for installation in transmissions already in use, where it is impracticable to attempt to form a reduced end on the end of the driven shaft 30. In such cases the sleeve 22 is formed with a continuous annular ring at 48 instead of a series of bosses. The portions of this ring between the flat segments forming abutments for the rollers 28, have cylindrical sliding engagement as at 51, with the inner wall of the casing 16 to maintain axial alignment of the parts.

In Fig. 1 the pins 26 are tapered to hold the rollers 28 in place, and in Fig. 3 they have shoulders for the same purpose.

The spring 50 is made so that the ratio between the spring tension and the displacement of the parts increases as the displacement increases. Thus, the clearance at 52 increases gradually throughout the length of the spring, being substantially twice as great at 54 and still greater at 56, up to the point of abutment with the thrust ring 57. As the rollers ride up the cam faces, the clearance at 52 will be eliminated by the coils of the spring moving into abutment, and the effective length of the spring will be correspondingly decreased and the stiffness increased.

It will be noted that the slope or pitch of the cam faces 18 increases from zero at the position illustrated, up to infinity, or parallelism with the axis of the device, at the end of the movement. Thus, with a spring of constant stiffness as in Fig. 1, the ratio of the restoring force to the displacement is not a constant, but increases rapidly with the displacement. In the embodiment of Fig. 3, the non-uniform stiffness of the spring increases this variation from a constant ratio between torque and displacement. Regardless of the loads or moments of inertia between which the device is connected, this produces a system where the period of oscillation due to liberation of the energy stored in the spring is very far from constant at different amplitudes of oscillation.

Without further elaboration, the foregoing will so fully explain the gist of our invention, that others may, by applying current knowledge, readily adapt the same for use under various conditions of service. Thus, it will be obvious that a conical spring may be substituted for the spring 50 where the conditions of service permit of a casing large enough to house such a spring; that any number of cam openings may be employed; and that the torque capacity may also be increased in direct proportion to the increase of the outside diameter of the casing, since the load is transmitted at points close to the outer periphery of the entire structure. Many modifications and alterations may readily be made by those skilled in the art, without eliminating certain features which may properly be said to constitute the essential items of novelty involved, which items are intended to be defined and secured to us by the following claims.

What we claim is:—

1. A power transmission comprising, in combination, a universal joint; a casing formed integral with the driven member of said joint; cams formed as openings in the outer wall of said casing; rollers riding in said openings; a driven sleeve carrying said rollers; a driven shaft splined directly inside said sleeve; a compression spring acting axially on said sleeve and rollers, said spring having a variable ratio of force to yield; a compression nut threaded to the end of said casing and slidable on said sleeve, said nut forming an adjustable abutment for said spring; said cams compressing said spring upon relative lost motion in either direction, the pitch of said cams increasing with increased displacement; a dust shield covering said casing; and a sliding contact connection through said sleeve between said casing and shaft for holding them in axial alignment.

2. A power transmission comprising, in combination, a universal joint; a casing formed integral with the driven member of said joint; cams formed as openings in the outer wall of said casing; contact rollers riding on said cams; a driven sleeve carrying said rollers; a driven shaft splined inside said sleeve; a spring acting axially on said sleeve and elements; a compression nut threaded to the end of said casing and forming an adjustable abutment for said spring; said cams tensioning said spring upon relative lost motion in either direction, the pitch of said cams increasing with increased displacement.

3. A power transmission comprising, in combination, a casing; cams formed as openings in the outer wall of said casing; contact elements riding on said cams; a driven sleeve carrying said elements; a driven shaft splined inside said sleeve; a spring acting axially on said sleeve and elements; an abutment for said spring; said cams tensioning said spring upon relative lost motion in either direction, the pitch of said cams increasing smoothly to infinity with increased displacement.

4. A power transmission comprising, in combination, a casing; cams formed as openings in the outer wall of said casing; contact elements riding on said cams; a driven element carrying said contact elements; and resilient means acting axially on said contact elements; said cams tensioning said resilient means upon relative lost motion in either direction, the pitch of said cams increasing smoothly with increased displacement throughout their entire extent.

5. A transmission comprising, in combination, a drive element; a universal joint connection actuated by said drive element; an annular dust shield on said drive element having the shape of a portion of a sphere; a torsion shock absorber driven by said connection; a dust shield for said torsion shock absorber; and an extension on said last mentioned dust shield articulated with the shield on said drive element.

In testimony whereof, we have signed our names to this specification.

GEORGE W. COLE.
LAWRENCE V. DAVIS.